(12) United States Patent
Jung et al.

(10) Patent No.: US 8,492,463 B2
(45) Date of Patent: Jul. 23, 2013

(54) FLAMEPROOF THERMOPLASTIC RESIN COMPOSITION

(75) Inventors: In Chul Jung, Seoul (KR); Bok Nam Jang, Anyang-si (KR); Hee Jung Park, Guri-si (KR); Jung Hwan Yun, Gunpo-si (KR); Jin Hwan Choi, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 590 days.

(21) Appl. No.: 12/126,317

(22) Filed: May 23, 2008

(65) Prior Publication Data

US 2009/0012217 A1 Jan. 8, 2009

(30) Foreign Application Priority Data

Jul. 2, 2007 (KR) .................... 10-2007-0066106

(51) Int. Cl.
*C08G 18/77* (2006.01)
(52) U.S. Cl.
USPC .................. 524/115; 524/147; 524/414
(58) Field of Classification Search
USPC .................................................. 524/147
See application file for complete search history.

(56) References Cited

U.S. PATENT DOCUMENTS

| | | | |
|---|---|---|---|
| 5,061,745 A | 10/1991 | Wittmann et al. | |
| 5,162,416 A * | 11/1992 | Udipi | 524/399 |
| 5,204,394 A | 4/1993 | Gosens et al. | |
| 5,369,154 A * | 11/1994 | Laughner | 523/436 |
| 5,627,228 A * | 5/1997 | Kobayashi | 524/127 |
| 5,674,924 A | 10/1997 | Lee et al. | |

FOREIGN PATENT DOCUMENTS

JP 1998-168297 12/1996

OTHER PUBLICATIONS

Van Krevelen, "Some basic aspects of flame resistance of polymeric materials," Journal of Polymer, Aug. 1975, pp. 615-620, vol. 16, Akzo Research and Engineering, Amhern, The Netherlands.
Japanese Office Action in counterpart Japanese Application No. 2008-173884, dated Jun. 7, 2011, pp. 1-3.

* cited by examiner

*Primary Examiner* — Doris Lee
(74) *Attorney, Agent, or Firm* — Summa, Additon & Ashe, P.A.

(57) ABSTRACT

A flameproof thermoplastic resin composition can include (A) about 5 to about 40% by weight of an epoxy group-containing rubber modified aromatic vinyl copolymer resin, (B) about 30 to about 90% by weight of a polycarbonate resin, (C) about 1 to about 50% by weight of a polyester resin and (D) about 5 to about 30 parts by weight of a phosphorus-containing flame retardant, per 100 parts by weight of a base resin comprising (A), (B) and (C).

14 Claims, No Drawings

FLAMEPROOF THERMOPLASTIC RESIN COMPOSITION

CROSS-REFERENCE TO RELATED APPLICATIONS

This non-provisional application claims priority under 35 USC Section 119 from Korean Patent Application No. 2007-66106, filed Jul. 2, 2007, which is hereby incorporated by reference in its entirety

FIELD OF THE INVENTION

The present invention relates to a halogen-free flameproof thermoplastic resin composition.

BACKGROUND OF THE INVENTION

Generally, rubber modified aromatic vinyl copolymer resins can have good mold processability, impact strength, and appearance and have accordingly been widely used in the production of many electric or electronic goods. When a rubber modified aromatic vinyl copolymer resin is used in the production of heat-emitting products, the resin should further have flame retardancy.

A halogen-containing compound and an antimony-containing compound can be added to a rubber modified aromatic vinyl copolymer resin to give the resin good flame-retardant properties. However, the halogen-containing flame retardant is potentially harmful. Accordingly, a major concern in this field is to develop a flame retardant-rubber modified aromatic vinyl copolymer resin without a halogen-containing compound.

It is well known to employ a phosphorous, silicon, boron, or nitrogen compound as a halogen-free flame retardant for a resin composition. However, such compounds cannot impart sufficient flame retardancy.

*Journal of Polymer* (Elsevier Science, 1975, vol. 16, pp. 615-620) discloses that rubber modified styrene-containing resin has a low Limiting Oxygen Index (LOI), because it does not form char during thermogravimetric analysis (TGA) and combustion. Halogen-containing compounds can readily impart a desired degree of flame-retardancy, regardless of the kind of resin. It is difficult, however, to provide rubber modified styrene-containing resins which do not form char with sufficient flame retardancy using only phosphorous- or nitrogen-flame retardants, because these non-halogenated flame retardants typically act on a solid phase.

In order to solve the above problems, U.S. Pat. Nos. 5,061,745; 5,204,394; and 5,674,924 disclose adding a phosphate ester compound and a polycarbonate to a rubber modified aromatic vinyl copolymer resin to impart flame retardancy. However, a relatively high amount of polycarbonate is required to obtain sufficient flame retardancy.

SUMMARY OF THE INVENTION

The present inventors have developed an environmentally friendly flameproof thermoplastic resin composition which has excellent flame retardancy and impact resistance. The flameproof thermoplastic resin composition of the invention comprises (A) an epoxy group-containing rubber modified aromatic vinyl copolymer resin; (B) a polycarbonate resin; (C) a polyester resin; and (D) a phosphorus-containing flame retardant.

The foregoing resin composition can include (A) about 5 to about 40% by weight of an epoxy group-containing rubber modified aromatic vinyl copolymer resin; (B) about 30 to about 90% by weight of a polycarbonate resin; (C) about 1 to about 50% by weight of a polyester resin; and (D) about 5 to about 30 parts by weight of a phosphorus-containing flame retardant, per 100 parts by weight of a base resin comprising (A), (B) and (C).

In exemplary embodiments of the invention, the epoxy group-containing rubber modified aromatic vinyl copolymer resin (A) comprises ($a_1$) about 0.5 to about 95% by weight of an aromatic vinyl graft copolymer resin and ($a_2$) about 5 to about 99.5% by weight of an epoxy group-containing vinyl copolymer resin.

In exemplary embodiments of the invention, the aromatic vinyl graft copolymer resin ($a_1$) comprises ($a_{11}$) about 20 to about 100% by weight of a graft copolymer resin and ($a_{12}$) about 0 to about 80% by weight of a copolymer resin.

In exemplary embodiments of the invention, the graft copolymer resin ($a_{11}$) is a graft copolymer of about 5 to about 60% by weight of a rubbery polymer, about 20 to about 80% by weight of an aromatic vinyl monomer and about 5 to about 45% by weight of a monomer copolymerizable with the aromatic vinyl monomer. In exemplary embodiments of the invention, the copolymer resin ($a_{12}$) is a copolymer of about 50 to about 95% by weight of an aromatic vinyl monomer and about 5 to about 50% by weight of an unsaturated nitrile monomer.

In exemplary embodiments of the invention, the epoxy group-containing vinyl copolymer resin ($a_2$) is a copolymer comprising ($a_{21}$) about 0.001 to about 5 mol % of an epoxy group-containing unsaturated epoxy compound and ($a_{22}$) about 95 to about 99.999 mol % of a vinyl compound.

Another aspect of the invention provides an article molded from the foregoing resin composition. In exemplary embodiments of the invention, the molded article can have an Izod notch impact strength of about 40 kgf cm/cm or more measured in accordance with ASTM D-256 using a ⅛" thick test sample and a flame retardancy of V0 according to UL 94 VB at a sample thickness of 2.5 mm.

Another aspect of the invention provides a pellet extruded from the foregoing resin composition.

Another aspect of the invention provides an electric/electronic housing molded from the foregoing resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Epoxy Group-Containing Rubber Modified Aromatic Vinyl Copolymer Resin

The epoxy group-containing rubber modified aromatic vinyl copolymer resin of the present invention may be prepared by blending ($a_1$) rubber modified aromatic vinyl graft copolymer resin and ($a_2$) epoxy group-containing vinyl copolymer resin which does not contain rubber.

The epoxy group-containing rubber modified aromatic vinyl copolymer resin comprises ($a_1$) aromatic vinyl graft copolymer resin and ($a_2$) epoxy group-containing vinyl copolymer resin. In exemplary embodiments, the epoxy group-containing rubber modified aromatic vinyl copolymer resin comprises ($a_1$) about 0.5 to about 95% by weight of an aromatic vinyl graft copolymer resin and ($a_2$) about 5 to about 99.5% by weight of an epoxy group-containing vinyl copolymer resin.

The epoxy group-containing rubber modified aromatic vinyl copolymer resin (A) is used in an amount of about 5 to about 40% by weight, based on the weight of the base resin.

($a_1$) Aromatic Vinyl Graft Copolymer Resin

The aromatic vinyl graft copolymer resin according to the present invention can be a polymer in which rubber phase polymers are dispersed in the form of particles in a matrix (continuous phase) comprising an aromatic vinyl polymer. In exemplary embodiments of the invention, the aromatic vinyl graft copolymer resins may be prepared by polymerizing the aromatic vinyl monomers with rubbers. In exemplary embodiments, other monomers copolymerizable with the aromatic vinyl monomers may also be employed along with the aromatic vinyl monomers.

The aromatic vinyl graft copolymer resin may be prepared by methods such as emulsion polymerization, suspension polymerization, bulk polymerization, and by extrusion of a graft copolymer resin and a copolymer resin. In bulk polymerization, both a graft copolymer resin and a copolymer resin are prepared together in one process. In other polymerizations, the graft copolymer resin and the copolymer resin may be prepared separately. Regardless of the polymerization technique used, the rubber content in a final aromatic vinyl graft copolymer resin can be about 5 to about 60% by weight.

In exemplary embodiments of the invention, the Z-average size of rubber particles of the aromatic vinyl graft copolymer resin ($a_1$) can range from about 0.05 to about 6.0 μm, for example from about 0.1 to about 4 μm, to obtain desirable properties during blending of the epoxy group-containing rubber modified aromatic vinyl copolymer resin and polyester resin.

In the aromatic vinyl graft copolymer resin of the present invention, the graft copolymer resin can be used alone or in combination with the copolymer resin, depending on the compatibility thereof.

($a_{11}$) Graft Copolymer Resin

The graft copolymer resin ($a_{11}$) may be prepared by graft-polymerizing rubbery polymer, aromatic vinyl monomer, monomer copolymerizable with the aromatic vinyl monomer and optionally other monomer(s) imparting processability and heat resistance.

Examples of the rubbery polymers may include, but are not limited to, diene rubbers such as polybutadiene, poly(styrene-butadiene), poly(acrylonitrile-butadiene), and the like; saturated rubbers in which hydrogen is added to a diene rubber; isoprene rubbers; acryl rubbers such as polybutyl acrylic acid; and terpolymers of ethylene-propylene-diene (EPDM), and the like, and combinations thereof. The content of rubbery polymer in the graft copolymer resin may be about 5 to about 60% by weight, for example about 20 to about 60% by weight, based on the total weight of the graft copolymer resin ($a_{11}$). The average size of the rubber particles can range from about 0.05 to about 6 μm taking into account the desired impact strength and appearance of the resin composition.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like, and combinations thereof. The aromatic vinyl monomer may be used in an amount of about 20 to about 80% by weight, for example about 30 to about 75% by weight, based on the total weight of the graft copolymer resin ($a_{11}$).

The graft copolymer resin ($a_{11}$) can include at least one other monomer copolymerizable with the aromatic vinyl monomer. Examples of monomers which may be copolymerized with the aromatic vinyl monomers may include, but are not limited to, a cyanide vinyl-containing compound such as acrylonitrile or an unsaturated nitrile-containing compound such as methacrylonitrile and ethacrylonitrile. These monomers may be used alone or in combination of two or more. The monomer copolymerizable with the aromatic vinyl monomer may be used in an amount of about 5 to about 45% by weight, based on the total weight of the graft copolymer resin ($a_{11}$).

Examples of the monomer imparting processability and heat resistance may include without limitation acrylic acid, methacrylic acid, methyl(meth)acrylate, ethyl(meth)acrylate, propyl(meth)acrylate, butyl(meth)acrylate, maleic anhydride, N-substituted maleimide, and the like, and combinations thereof. The monomer imparting process ability and heat resistance may be used in an amount of about 0 to about 15% by weight, based on the total weight of the graft copolymer resin ($a_{11}$).

($a_{12}$) Copolymer Resin

The copolymer resin of the present invention may be prepared by copolymerizing aromatic vinyl monomer, monomer copolymerizable with the aromatic vinyl monomer and optionally other monomer(s) imparting processability and heat resistance. The monomer ratio may be adjusted depending on the monomer ratio of the graft copolymer resin ($a_{11}$) excluding rubber and compatibility.

Examples of the aromatic vinyl monomer may include, but are not limited to, styrene, α-methyl styrene, β-methyl styrene, p-methyl styrene, p-t-butyl styrene, ethylstyrene, vinyl xylene, monochlorostyrene, dichlorostyrene, dibromostyrene, vinyl naphthalene, and the like, and combinations thereof. The aromatic vinyl monomer can be used in an amount of about 50 to about 95% by weight, based on the total weight of the copolymer resin ($a_{12}$).

Examples of the monomer copolymerizable with the aromatic vinyl monomer may include, but are not limited to, a vinyl cyanide compound such as acrylonitrile or an unsaturated nitrile compound such as ethacrylonitrile and methacrylonitrile, and may be used alone or in combination of two or more. The amount of the monomer copolymerizable with the aromatic vinyl monomer can be about 5 to about 50% by weight, based on the total weight of the copolymer resin ($a_{12}$).

Examples of the monomers imparting processability and heat resistance may include without limitation acrylic acid, methacrylic acid, methyl(meth)acrylate, ethyl(meth)acrylate, propyl(meth)acrylate, butyl(meth)acrylate, maleic anhydride, N-substituted maleimide and the like, and combinations thereof. The amount of the monomers imparting processability and heat resistance can be about 0 to about 30% by weight, based on the total weight of the copolymer resin ($a_{12}$).

In exemplary embodiments of the invention, the copolymer resin ($a_{12}$) can be styrene-acrylonitrile copolymer resin (SAN).

In exemplary embodiments of the invention, the aromatic vinyl graft copolymer resin ($a_1$) can be copolymer resins of acrylonitrile-butadiene-styrene (ABS), copolymer resins of acrylonitrile-ethylenepropylene rubber-styrene (AES), copolymer resins of acrylonitrile-acrylic rubber-styrene (AAS), and the like, and combinations thereof.

The aromatic vinyl graft copolymer resin ($a_1$) can include about 20 to about 100% by weight of the graft copolymer resin ($a_{11}$) and about 0 to about 80% by weight of the copolymer resin ($a_{12}$).

($a_2$) Epoxy Group-Containing Vinyl Copolymer Resin

The epoxy group-containing vinyl copolymer resin of the present invention can be prepared by polymerizing a monomer mixture comprising an epoxy group-containing unsaturated epoxy compound ($a_{21}$) and a vinyl compound ($a_{22}$) so that the unsaturated epoxy group is present in the vinyl copolymer.

The monomer mixture may comprise about 0.001 to about 5.0 mol % of an epoxy group-containing unsaturated epoxy compound ($a_{21}$) and about 99.999 to about 95 mol % of a vinyl compound ($a_{22}$).

($a_{21}$) Epoxy Compound

The epoxy compound used in the invention can be represented by the following chemical formula 1.

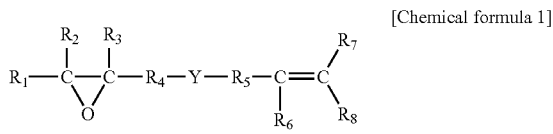

[Chemical formula 1]

Wherein $R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, alkyl-substituted aryl (for example saturated $C_1$-$C_{12}$ alkyl-substituted $C_6$-$C_{14}$ aryl); or unsaturated alkyl-substituted aryl (for example unsaturated $C_1$-$C_{12}$ alkyl-substituted $C_6$-$C_{14}$ aryl); and Y is an ether group (—O—), carboxyl group (—O—[C=O]—, —[O=C]—O—), $C_1$-$C_{12}$ alkylene, $C_6$-$C_{14}$ arylene, or alkyl-substituted arylene (for example saturated or unsaturated $C_1$-$C_{12}$ alkyl-substituted $C_6$-$C_{14}$ arylene);

with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene; and when Y is $C_1$-$C_{12}$ alkylene, $C_6$-$C_{14}$ arylene or alkyl-substituted arylene, Y represents a ($R_4$—Y—$R_5$) structure.

Examples of the epoxy compound may include, but are not limited to, epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. These epoxy compounds can be used alone or in combination with one another.

In exemplary embodiments of the invention, the epoxy compound is added as a comonomer in an amount of about 0.001 to about 5 mol %, for example about 0.1 to about 5 mol %, and as another example about 1 to about 5 mol %. If the amount of the epoxy compound is less than about 0.001 mol %, it can be difficult to improve impact strength. When the amount of the epoxy compound exceeds about 5 mol %, there can be a problem of gelation during an extrusion process, low flowability and insufficient flame retardancy.

($a_{22}$) Vinyl Compound

The vinyl compound of the present invention may comprise an aromatic vinyl monomer and a monomer copolymerizable with the aromatic vinyl monomer.

Examples of the aromatic vinyl monomers may include, but are not limited to, styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene and the like. These aromatic vinyl monomers can be used alone or in combination with one another.

The monomer copolymerizable with the aromatic vinyl monomer may be used alone or in combination with one or more other copolymerizable monomers. Examples of the monomer copolymerizable with the aromatic vinyl monomer may include, but are not limited to, unsaturated nitrile monomers such as acrylonitrile, methacrylonitrile and ethacrylonitrile, and the like, and combinations thereof.

The ratio of the aromatic vinyl monomers to the monomer copolymerizable with the aromatic vinyl monomer can be determined by the ratio of monomers of the aromatic vinyl graft copolymer resin ($a_1$) excluding rubber and compatibility. The vinyl compound can include about 40 to about 90% by weight of an aromatic vinyl monomer and about 10 to about 60% by weight of a monomer copolymerizable with the aromatic vinyl monomer. As another example, the vinyl compound can include about 50 to about 80% by weight of aromatic vinyl monomer and about 20 to about 50% by weight of monomer copolymerizable with the aromatic vinyl monomer. If the amount of the aromatic vinyl monomers is less than about 40% by weight, the viscosity can significantly rise, which can negatively affect molding performance. When the amount of the aromatic vinyl monomers is more than about 90% by weight, it can be difficult to improve mechanical strength.

The vinyl compound ($a_{22}$) can optionally further include at least one other monomer to impart processability and heat resistance. Examples of monomers imparting processability and heat resistance may include without limitation acrylic acid, methacrylic acid, maleic anhydride, $C_1$-$C_4$-alkyl methacrylate, phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate; N-substituted maleimide; maleic acid, fumaric acid, itaconic acid and anhydrides thereof, nitrogen functional monomers such as dimethyl aminoethyl acrylate, diethyl aminoethyl acrylate, vinyl imidazole, vinyl pyrrolidone, vinyl caprolactam, vinylcarbazole, vinylaniline, acrylamide and methacrylamide; and the like, and combinations thereof. The amount of the monomers imparting processability and heat resistance can be about 0 to about 30% by weight, for example about 1 to about 20% by weight, and as another example about 2 to about 15% by weight, based on the total weight of the vinyl compound ($a_{22}$).

(B) Polycarbonate Resin

The polycarbonate resin of the present invention may be prepared by reacting a diphenol represented as chemical formula 2 with a phosgene, a halogen formate or a carbonic diester.

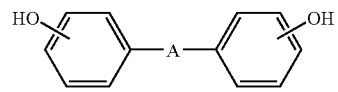

[Chemical formula 2]

wherein A is a single bond, a $C_{1-5}$ alkylene group, a $C_{1-5}$ alkylidene group, a $C_{5-6}$ cycloalkylidene group, S or $SO_2$.

Examples of the diphenol can include without limitation hydroquinol, resocinol, 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. Advantageous diphenols can include 2,2-bis-(4-hydroxyphenyl)-propane (also referred to as bisphenol A), 2,2-bis-(3,5-dichloro-4-hydroxyphenyl)-propane, 1,1-bis-(4-hydroxyphenyl)-cyclohexane, and the like, and combinations thereof.

In the present invention, the polycarbonate resin can have a weight average molecular weight ($M_w$) of about 10,000 to about 200,000, for example about 15,000 to about 80,000.

Suitable polycarbonates incorporated into the composition of the present invention may be branched in a known manner, for example, by incorporating about 0.05 to about 2 mol %, based to total quantity of diphenols used, of tri- or higher functional compounds, for example, those with three or more phenolic groups.

In exemplary embodiments of the invention, the polycarbonate resin can comprise about 30 to about 90% by weight, for example about 40 to about 85% by weight, and as another example about 50 to about 80% by weight, of the total weight of the base resin. The polycarbonate resin may make it easier to impart flame retardancy to the resin composition. Accordingly, if the amount of the polycarbonate resin is less than about 30% by weight, flame retardancy and mechanical strength of the resin composition may be deteriorated.

(C) Polyester Resin

The polyester resin together with a polycarbonate can be used as a char-forming source since polyester resins contain aromatic rings and oxygen atoms in their backbone.

Further, when blending polyesters with polycarbonates, transesterification may occur between them, which can improve compatibility between the two. As a result, the resin composition can obtain good flame retardancy without degrading flame retardancy of polycarbonate.

The polyester used in the present invention is polyester resin having an intrinsic viscosity of about 0.3 to about 1.0 g/dL or a copolymer thereof. If the intrinsic viscosity is less than about 0.3 g/dL, it can be difficult to obtain sufficient impact strength. If the intrinsic viscosity is more than about 1.0 g/dL, it can be difficult to obtain the resin composition according to the present invention.

In exemplary embodiments, the polyester used in the present invention is polyester resin having an intrinsic viscosity of about 0.3 to about 1.0 g/dL or a copolymer thereof in order to provide good impact strength.

In exemplary embodiments of the invention, the polyester resin may be prepared by condensation polymerization reaction of acid or ester such as terephthalic acid (TPA), isophthalic acid (IPA), 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof, and diols having 2 to 12 carbon atoms such as ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like, and combinations thereof. The condensation polymerization reaction can be easily carried out by a person of ordinary skill in the art.

In exemplary embodiments of the invention, the polyester resin (C) may be polyalkylene terephthalate such as polyethylene terephthalate (PET), polybutylene terephthalate (PBT) and the like; polyalkylene naphthalate such as polyethylene naphthalate (PEN) and the like; polycyclohexane terephthalate (PCT) and the like.

In another exemplary embodiment of the invention, the polyester resin (C) may be noncrystalline polyester. The noncrystalline polyester can be a glycol-modified polyalkylene terephthalate, such as poly(ethylene-1,4-cyclohexanedimethylene terephthalate) (PETG).

Combinations of polyester resin can be used, and a recycled polyester resin can also be used.

In exemplary embodiments of the invention, the polyester resin (C) may be a polyester resin in which inorganic particles are mixed therein. Examples of suitable inorganic particles useful in the invention can include without limitation titanium dioxide ($TiO_2$), silicone dioxide ($SiO_2$), aluminum hydroxide ($Al(OH)_3$) and the like, and combinations thereof.

In the present invention, the polyester resin is part of a base resin and is used in an amount of about 1 to about 50% by weight, for example about 5 to about 40% by weight, and as another example about 10 to about 35% by weight, based on the total weight of the base resin to provide the resin composition with a good balance of impact strength and flame retardancy.

(D) Phosphorus-Containing Flame Retardant

The phosphorus-containing flame retardant may be an organo-phosphorous compound. Examples of the organo-phosphorous compound may include, but are not limited to, phosphate, phosphonate, phosphinate, phosphine, oxide, phosphazene, metal salts thereof and the like. These compounds can be used alone or in combination with one another.

An aromatic phosphoric acid ester compound represented by the following chemical formula 3 can be used as the phosphate:

[Chemical formula 3]

$$R_1-O-\underset{\underset{R_2}{|}}{\overset{\overset{O}{\|}}{P}}-O-\left[R_3-O-\underset{\underset{R_4}{|}}{\overset{\overset{O}{\|}}{P}}-O\right]_n-R_5$$

wherein $R_1$, $R_2$, $R_4$, and $R_5$ are independently $C_6$-$C_{20}$ aryl group or an alkyl-substituted $C_6$-$C_{20}$ aryl group (for example saturated or unsaturated $C_1$-$C_{12}$ alkyl-substituted $C_6$-$C_{20}$ aryl), $R_3$ is a derivative of a dialcohol comprising resorcinol, hydroquinol, bisphenol-A, or bisphenol-S; and n is 0 to 5.

The aromatic phosphoric acid ester compound may be used in an amount of about 5 to about 30 parts by weight, for example about 10 to about 25 parts by weight, and as another example about 15 to about 20 parts by weight, per 100 parts by weight of base resin comprising (A)+(B)+(C). If the amount is less than about 5 parts by weight, the resin composition may not have sufficient flame retardancy. On the other hand, if the amount is more than 30 parts by weight, the heat resistance and mechanical strength of the resin composition may be deteriorated.

Where n is 0, the compound represented in chemical formula 3 can include for example triphenylphosphate, tricresylphosphate, cresyldiphenylphosphate, trixylenylphosphate, tri(2,4,6-trimethylphenyl)phosphate, tri(2,4-ditertiarybutylphenyl)phosphate, tri(2,6-ditertiarybutylphenyl)phosphate, and the like.

Where n is 1, the compound represented in chemical formula 3 can include for example resorcinolbis(diphenylphosphate), hydroquinolbis(diphenylphosphate), bisphenolA-bis(diphenylphosphate), resorcinolbis(2,6-ditertiarybutylphenylphosphate), hydroquinolbis(2,6-dimethylphenylphosphate), and the like.

Where n is 2 or more, the compound may be a mixture of oligomer types. The aromatic phosphoric acid ester compound can be used alone or in combination therewith.

Other conventional phosphorous-containing flame retardants, such as red phosphorous, phosphonates, phophinates, phosphazenes, and the like can replace the aromatic phosphoric acid ester compound partially or totally.

Other additives may be included in the resin composition of the present invention. Examples of such additives include without limitation lubricants, releasing agents, antistatic agents, anti-dripping agents, impact modifiers, anti-oxidants, plasticizers, heat stabilizers, light stabilizers, compatibilizers, pigments, dyes, inorganic fillers and combinations thereof.

The inorganic filler may include glass fiber, silica, talc, ceramic, and the like.

The additive can be employed in an amount of about 0 to about 50 parts by weight, per 100 parts by weight of the base resin.

The resin composition according to the present invention can be prepared by a conventional process. For example, all the components and additives can be mixed together and extruded through an extruder and can be prepared in the form of pellets.

Another aspect of the invention provides an article molded from the foregoing resin composition. In exemplary embodiments of the invention, the molded article can have an Izod notch impact strength of about 40 kgf cm/cm or more measured in accordance with ASTM D-256 using a ⅛" thick test sample and a flame retardancy of V0 according to UL 94 VB at a sample thickness of 2.5 mm.

The resin composition of the present invention can be molded into various products. The resin composition of the invention can be particularly suitable for the production of electric or electronic housings, computer or office equipment housings, structural materials and the like.

The invention may be better understood by reference to the following examples which are intended for the purpose of illustration and are not to be construed as in any way limiting the scope of the present invention, which is defined in the claims appended hereto.

EXAMPLES (A) Epoxy group-containing rubber modified aromatic vinyl resin ($a_1$) Aromatic vinyl graft copolymer resin: ABS graft copolymer resin ($a_{11}$) Graft copolymer resin 50 parts of butadiene rubber latex (solid content), 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain graft copolymer (g-ABS) latex. To the g-ABS latex, 0.4 parts of sulfuric acid is added, coagulated and dried to obtain graft ABS copolymer resin (g-ABS) in powder form.

($a_{12}$) Copolymer Resin 72 parts of styrene, 28 parts of acrylonitrile, 120 parts of deionized water and 0.2 parts of azobisisobutylonitrile (AIBN) are mixed. To the mixture, 0.4 parts of tricalcium-phosphate and 0.2 parts of mercaptan-containing chain transfer agent are added. The resultant solution is heated to 80° C. for 90 minutes and kept for 240 minutes. The resultant is washed, dehydrated and dried to obtain styrene-acrylonitrile copolymer resin (SAN) in powder form. The weight average molecular weight of the SAN copolymer resin is 180,000 to 200,000.

($a_2$) Epoxy Group-Containing Vinyl Copolymer Resin: GMA 5%-SAN Copolymer Resin To a mixture comprising 100 parts by weight of monomer mixture including 5.0 mol % of glycidyl methacrylate and 95.0 mol % of vinyl compound including 70 parts by weight of styrene and 30 parts by weight of acrylonitrile and 120 parts by weight of deionized water are added 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes, maintained at this temperature for 180 minutes, and epoxy group-containing styrene-acrylonitrile copolymer resin (GMA-SAN) is obtained. The resultant product is washed, dehydrated and dried to obtain epoxy group-containing styrene-acrylonitrile copolymer resin (GMA-SAN) in the form of powder.

(B) Polycarbonate Resin

Polycarbonate resin (product name: Panlite L-1225 Grade) manufactured by Teijin Company of Japan is used.

(C) Polyester Resin

Semi-crystallalline polyethylene terephthalate resin (product name: PET1100A Grade) manufactured by Any Chem Co., Ltd. is used.

(D) Phosphorus-Containing Flame Retardant

Resorcinol bis(di-2,6-xylenyl) phosphate (product name: PX-200 Grade) by Daihachi Chemical Ind. is used.

Examples 1-4 and Comparative Examples 1-3

The components as shown in Table 1 are mixed and the mixture is extruded at 220 to 250° C. with a conventional twin-screw extruder into pellets. The resin pellets are dried at 80° C. for 3 hours, and molded into test specimens using a 8 oz injection molding machine at 230° C. and mold temperature of 60° C. The flame retardancy is measured in accordance with UL94 at a thickness of 2.5 mm. The Izod impact strength is measured in accordance with ASTM D-256 at a thickness of ⅛" (kgf·cm/cm). The results are shown in Table 1

TABLE 1

|  |  | Examples | | | | Comparative Examples | | |
|---|---|---|---|---|---|---|---|---|
|  |  | 1 | 2 | 3 | 4 | 1 | 2 | 3 |
| (A) g-ABS | ($a_{11}$) | 15 | 15 | 15 | 20 | 15 | 20 | 10 |
| resin | ($a_{12}$) | 10 | 5 | — | 5 | 15 | 10 | 15 |
|  | ($a_2$) | 5 | 10 | 15 | 10 | — | — | — |
| (B) polycarbonate | | 50 | 50 | 50 | 50 | 50 | 50 | 50 |
| (C) polyester | | 20 | 20 | 20 | 15 | 20 | 20 | 25 |
| (D) flame retardant | | 18 | 18 | 18 | 18 | 18 | 18 | 18 |
| Impact strength | | 43 | 53 | 58 | 66 | 27 | 39 | 18 |
| Flame retardancy | | V-0 | V-0 | V-0 | V-0 | Fail | Fail | Fail |

As shown in Table 1, Examples 1-4 employing an epoxy group-containing vinyl copolymer resin ($a_2$) show excellent impact strength as well as flame retardancy. However, Comparative Examples 1-3 not employing an epoxy group-containing vinyl copolymer resin ($a_2$) of the present invention show that the impact strength and flame retardancy are deteriorated.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flameproof thermoplastic resin composition comprising:
    (A) about 5 to about 40% by weight of an epoxy group-containing rubber modified aromatic vinyl copolymer resin comprising ($a_1$) about 0.5 to about 95% by weight of an aromatic vinyl graft copolymer resin and ($a_2$) about 5 to about 99.5% by weight of an epoxy group-containing vinyl copolymer resin, wherein said epoxy group-containing vinyl copolymer resin ($a_2$) is a copolymer comprising ($a_{21}$) about 0.001 to about 5 mol% of an epoxy group-containing unsaturated epoxy compound and ($a_{22}$) about 95 to about 99.999 mol% of a vinyl compound, wherein said ($a_{22}$) vinyl compound comprises about 40 to about 90% by weight of an aromatic vinyl monomer and about 10 to about 60% by weight of a monomer copolymerizable with the aromatic vinyl monomer;
    (B) about 30 to about 90% by weight of a polycarbonate resin;
    (C) about 1 to about 50% by weight of a polyester resin; and
    (D) about 5 to about 30 parts by weight of a phosphorus-containing flame retardant, per 100 parts by weight of a base resin comprising (A), (B) and (C) wherein said epoxy group-containing vinyl copolymer resin ($a_1$) is a copolymer consisting of ($a_{11}$) about 0.001 to about 5 mol % of an epoxy group-containing unsaturated epoxy compound and ($a_{22}$) about 95 to about 99.999 mol % of a vinyl compound, wherein said ($a_{22}$)vinyl compound consists of about 40 to about 90% by weight of an aromatic vinyl monomer selected from the group consisting of styrene, α-methyl styrene, β-methyl styrene, p-methyl styrene, p-t-butyl styrene, ethyl styrene, vinyl xylene, monochlorostyrene, dichlorostyrene, dibromosstrene, vinyl naphthalene, and combinations thereof, about 10 to about 60% by weight of monomer copolymerizable with the aromatic vinyl monomer selected from the group consisting of acrylonitrile, methacrylonitrile athacrylonitrile, and combinations thereof, and optionally about 0 to about 30% by weight of a monomer imparting processabilty and heat resistance selected from the group consisting of acrylic acid, methacrylic, maleic amhydride, $C_1$-$C_4$alkyl methacrylate, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate; N-substituted maleimide; maleic acid, fumaric acid, itaconic acid anhydrides thereof; dimethyl aminoethyl acrylate, diethyl aminoethyl acrylate, vinyl imadazole, vinyl pyrrolidone, vinyl caprolactam, vinylcarbazole, vinylaniline, acrylamide, methacrylamide; and combinations thereof.

2. The flameproof thermoplastic resin composition of claim 1, wherein said ($a_{21}$) epoxy group-containing unsaturated epoxy compound is represented by the following chemical formula 1:

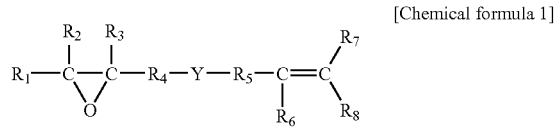

[Chemical formula 1]

wherein:
$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, alkyl-substituted aryl or unsaturated alkyl-substituted aryl; and
Y is an ether group (—O—), carboxyl group (—O—[C=O]—, —[O=C]—O—), $C_1$-$C_{12}$ alkylene, $C_6$-$C_{14}$ arylene, or alkyl-substituted arylene;
with the proviso that when Y is an ether group (—O—) or carboxyl group (—O—[C=O]—, —[O=C]—O—), $R_4$ and $R_5$ are each independently $C_1$-$C_{12}$ alkylene, $C_6$-$C_{14}$ arylene or alkyl-substituted arylene; and when Y is $C_1$-$C_{12}$ alkylene, $C_6$-$C_{14}$ arylene or alkyl-substituted arylene, Y represents a (R4-Y-R5) structure.

3. The flameproof thermoplastic resin composition of claim 1, wherein said unsaturated epoxy compound ($a_{21}$) is selected from the group consisting of epoxy alkyl acrylate, allyl glycidyl ester, aryl glycidyl ester, glycidyl methacrylate, glycidyl acrylate, butadiene monooxide, vinyl glycidyl ether, glycidyl itaconate and combinations thereof.

4. The flameproof thermoplastic resin composition of claim 1, further comprising at least one additive selected from the group consisting of lubricants, releasing agents, antistatic agents, anti-dripping agents, impact modifiers, anti-oxidants, plasticizers, heat stabilizers, light stabilizers, compatibilizers, pigments, dyes, inorganic fillers and combinations thereof.

5. The flameproof thermoplastic resin composition of claim 1, wherein said ($a_{22}$) vinyl compound consists of about 50 to about 90% by weight of said aromatic vinyl monomer and about 10 to about 60% by weight of said monomer copolymerizable with the aromatic vinyl monomer vinyl compound.

6. The flameproof thermoplastic resin composition of claim 1, wherein said monomer copolymerizable with the aromatic vinyl monomer is an unsaturated nitrile monomer.

7. The flameproof thermoplastic resin composition of claim 6, wherein said vinyl compound ($a_{22}$) is a copolymer of about 40 to about 90% by weight of an aromatic vinyl monomer selected from the group consisting of styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and combinations thereof and about 10 to about 60% by weight of the unsaturated nitrile monomer.

8. The flameproof thermoplastic resin composition of claim 1, wherein said phosphorus-containing flame retardant (D) is selected from the group consisting of phosphate, phosphonate, phosphinate, phosphine oxide, phosphazene, and metal salts thereof.

9. The flameproof thermoplastic resin composition of claim 8, wherein said phosphate is an aromatic phosphoric acid ester compound represented by the following chemical formula 3:

[Chemical formula 3]

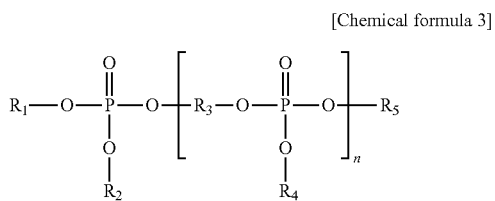

wherein $R_1$, $R_2$, $R_4$, and $R_5$ independently of one another are $C_6$-$C_{20}$ aryl group or alkyl-substituted $C_{6-20}$ aryl group, $R_3$ is a derivative of resorcinol, hydroquinol, bisphenol-A, or bisphenol-S, and n is 0 to 5.

10. The flameproof thermoplastic resin composition of claim 1, wherein said aromatic vinyl graft copolymer resin ($a_1$) comprises ($a_{11}$) about 20 to about 100% by weight of a graft copolymer resin and ($a_{12}$) about 0 to about 80% by weight of a copolymer resin.

11. The flameproof thermoplastic resin composition of claim 10, wherein said graft copolymer resin ($a_{11}$) is a graft copolymer of about 5 to about 60% by weight of a rubbery polymer, about 20 to about 80% by weight of an aromatic vinyl monomer and about 5 to about 45% by weight of a monomer copolymerizable with the aromatic vinyl monomer; and said copolymer resin ($a_{12}$) is a copolymer of about 50 to about 95% by weight of an aromatic vinyl monomer and about 5 to about 50% by weight of an unsaturated nitrile monomer.

12. The flameproof thermoplastic resin composition of claim 11, wherein said monomer copolymerizable with the aromatic vinyl monomer is selected from the group consisting of acrylonitrile, methacrylonitrile, methyl(meth)acrylate, ethyl(meth)acrylate, propyl(meth)acrylate, butyl(meth)acrylate, N-substituted maleimide, maleic anhydride and combinations thereof.

13. A molded article produced from the flameproof thermoplastic resin composition as defined by claim 1.

14. The molded article of claim 13, wherein said molded article has an Izod notch impact strength of about 40 kgf·cm/cm or more measured in accordance with ASTM D-256 using a ⅛" thick test sample and a flame retardancy of V0 according to UL 94 VB at a sample thickness of 2.5 mm.

* * * * *

UNITED STATES PATENT AND TRADEMARK OFFICE
CERTIFICATE OF CORRECTION

PATENT NO. : 8,492,463 B2
APPLICATION NO. : 12/126317
DATED : July 23, 2013
INVENTOR(S) : In Chul Jung et al.

It is certified that error appears in the above-identified patent and that said Letters Patent is hereby corrected as shown below:

In the Specification
Column 4, Line 18 should read
"binations thereof. The monomer imparting processability"

Column 5, Line 39 should read
"(R4 --Y --R5) structure."

In the Claims
Column 11, Line 40, Claim 1 should read
"epoxy group-containing vinyl copolymer resin $(a_2)$ is a"

Column 11, Line 41, Claim 1 should read
"copolymer consisting of $(a_{21})$ about 0.001 to about 5 mol"

Column 11, Line 50, Claim 1 should read
"mostyrene, vinyl naphthalene, and combinations"

Column 11, Line 54, Claim 1 should read
"methacrylonitrile and ethacrylonitrle, and combinations"

Column 11, Line 58, Claim 1 should read
"methacrylic, maleic anhydride, C1-C4alkyl methacry-"

Column 11, Line 65, Claim 1 should read
"hyl acrylate, vinyl imidazole, vinyl pyrrolidone, vinyl"

Signed and Sealed this
Nineteenth Day of November, 2013

Teresa Stanek Rea
*Deputy Director of the United States Patent and Trademark Office*